W. F. SCHMOELE & H. SCHMOELE, Jr.
ELECTRO PNEUMATIC MUSIC PLAYING APPARATUS.

No. 189,391. Patented April 10, 1877.

WITNESSES:

INVENTORS:
William Ford Schmoele.
Henry Schmoele Jr.

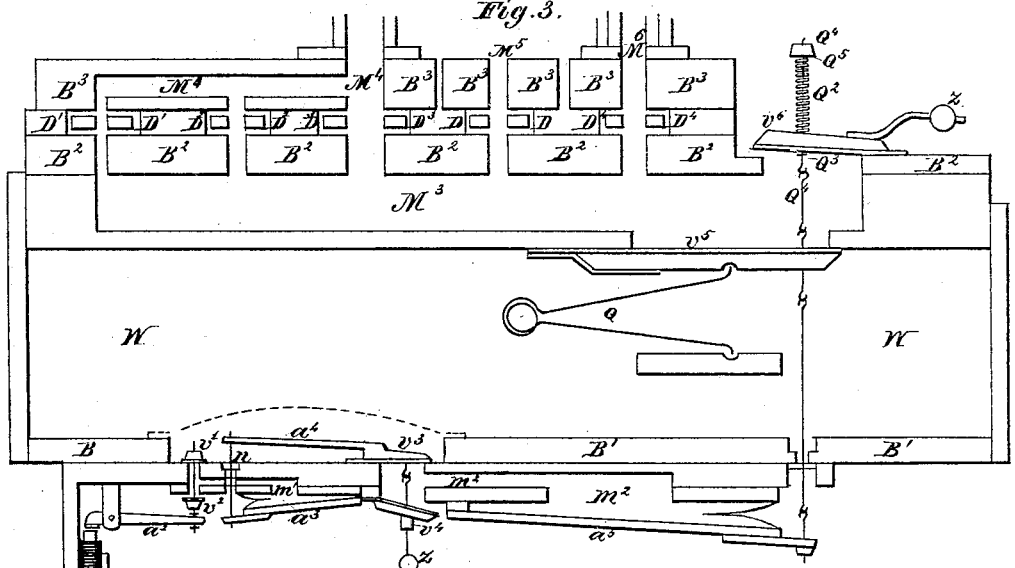
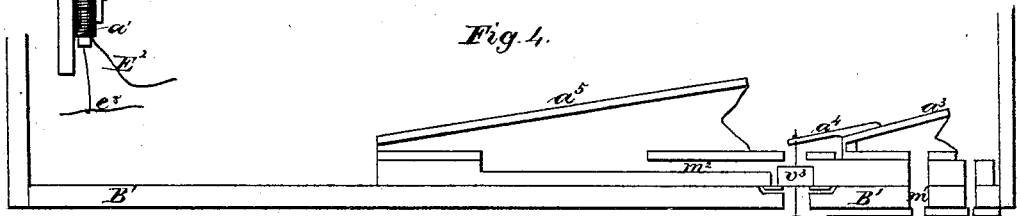
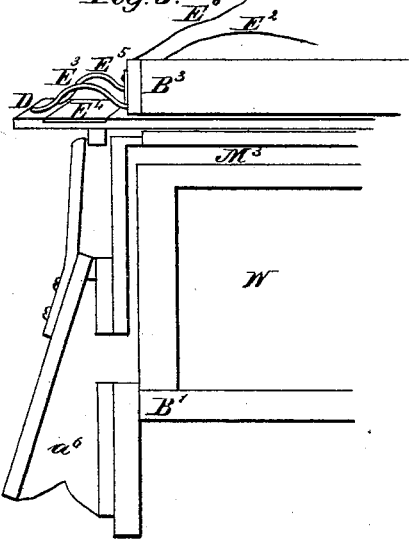
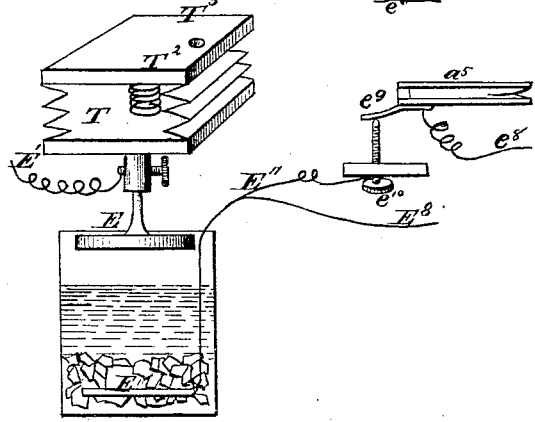

3 Sheets—Sheet 3.

W. F. SCHMOELE & H. SCHMOELE, Jr.
ELECTRO PNEUMATIC MUSIC PLAYING APPARATUS.

No. 189,391. Patented April 10, 1877.

Witnesses.
H. Schmoele, M.D.
Charles Schmoele.

Inventor.
William Ford Schmoele.
Henry Schmoele Jr.

UNITED STATES PATENT OFFICE.

WILLIAM F. SCHMOELE AND HENRY SCHMOELE, JR., OF PHILADELPHIA, PA., ASSIGNORS OF ONE-THIRD THEIR RIGHT TO CHARLES SCHMOELE.

IMPROVEMENT IN ELECTRO-PNEUMATIC MUSIC-PLAYING APPARATUS.

Specification forming part of Letters Patent No. 189,391, dated April 10, 1877; application filed February 25, 1874.

*To all whom it may concern:*

Figure 1:

Be it known that we, WILLIAM FORD SCHMOELE and HENRY SCHMOELE, Jr., both of the city and county of Philadelphia, and State of Pennsylvania, have invented, first, a double-face music-sheet, and, secondly, an instrument capable of reading and performing music by electricity, electro-magnetism, and compressed air, of which the following is a specification:

The first part of our invention consists in the representation of the music on both sides of the sheet by metallic marks or notes, printed or affixed upon the paper or other non-conductor of electricity. The breadth $X^1 X^1$, Figure 1, of the paper sheet represents the musical scale and various mechanical movements, each note claiming and occupying throughout the whole length $X^1 X^2$ a certain longitudinal space or zone corresponding to a finger or reader, $R^1$ or $R^2$, Fig. 2, on the reading apparatus of the instrument, which finger or reader governs the performance of the note. Between every second note-space is an extra space, designed for the ingress of the electricity upon the sheet, and corresponding to an extra finger or reader similarly located on the reading apparatus. Each metallic note (represented in Fig. 1 as dark marks) is printed to cover its proper note-space, and to extend over and cover the adjoining extra or ingress space. (Distinguished in the figure by the dotted lines.) Each note then, when the sheet is being drawn through the instrument, comes in contact with two readers or fingers, one (an ingress-reader) connected with one pole, E, Fig. 8, of the battery, the other (an egress-reader) connected with the action producing the corresponding note or sound upon the instrument, and thence with the other battery-pole $E^{12}$. Thus the notes as they occur upon the sheet form bridges from one reader to another, over or through which the electricity passes to the proper parts of the instrument.

The time is represented on the length of the sheet, each consecutive measure occupying a successive transverse zone or section of the length, and the location of the notes in these zones depending upon the beat, or fraction thereof, on which each falls. The length of the marks representing the notes varies according to the time-value of each.

For instruments containing but a few of the parts hereinafter described, only one side of the music-sheet need be printed; but for the complete instrument, containing all the parts, both sides of the sheet should have notes upon it, so as to utilize simultaneously both surfaces, thus avoiding an inconvenient width of sheet otherwise necessary to accommodate the great number of notes.

The printing of the metallic marks may be done by any of the ordinary processes.

The second part of our invention consists in the instrument designed to read and perform the music. We shall describe first the reading and then the performing parts.

Figure 2:
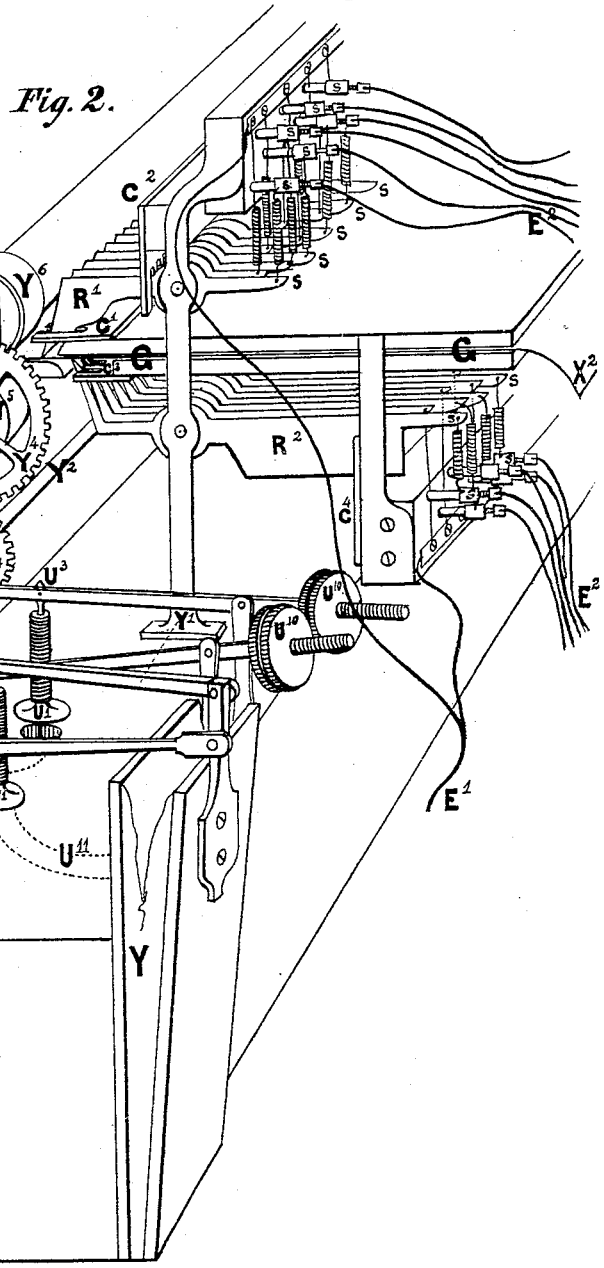

The reading apparatus, Fig. 2, consists of a number of parallel fingers, $R^1 R^2$, Fig. 2, called "readers," a long slot or guide, G, for steering the sheet, and a wind-engine, driving a pair of rollers to draw or feed it in.

The readers may be made in a variety of forms—for instance, small metal springs, ranged in line, and fastened at one end to a non-conducting support, the other end being free and bearing upon the sheet. But the best form, where it is necessary to get the readers of many instruments exactly to correspond, is thus made: The readers $R^1 R^2$, Fig. 2, stamped by a die out of sheet metal, are mounted or swung upon a rod of ebony or other hard wood, which rod passes through a hole stamped in them to receive it, and is turned to fit the holes accurately. The weight of the metal in the readers is so distributed that, being free to move on their support, gravity keeps them in contact with the sheet, on which they all press uniformly, lightly, and yet surely. Two or more rubber combs, $C^1$ and $C^2$, $C^3$ and $C^4$, whose teeth form stalls for the reception of the readers, secure and keep them in position, the one comb, $C^1$ or $C^3$, being placed near the points, which are thus guided, and the other comb, $C^2$ or $C^4$, forming a second guide, to keep them from shifting. As the position of the readers becomes thus dependent upon the teeth of the combs which guide them, the problem of getting the readers of any number of instruments exactly to correspond, so that the same sheet may fit all of them perfectly alike, resolves itself merely into getting the combs cut accurately alike. A fine spiral spring, S, fastened to the tail of each reader, serves to form electric communication with the binding-post, from which goes out the line-wire $E^2$, at the same time that it tends, by its traction force, to assist in gently holding the point upon the music-sheet $X^1$ $X^2$. Every third reader, commencing at the second in the row, then the fifth, eighth, eleventh, and so on, is connected, not with a binding-post and special line wire, but with a common or ingress wire, $E^1$, Figs. 2 and 8, coming from one pole of the battery. These are called "ingress-readers," to distinguish them from the others, and they serve to bring the electricity in upon the sheet, whence it passes through the notes, as they occur, to the egress-readers, or those connected, each through its special binding-post and special line-wire $E^2$, with its own electro-pneumatic action, and thence, by a common return or egress wire, $E^8$ or $e^8$, and $E^{11}$, Fig. 8, with the other pole of the battery. In leading the line-wires, which are all insulated wires, from the reading apparatus to the electro-pneumatic actions throughout the instrument, it is found most convenient to group together into a species of cable all those going in the same direction, by wrapping them in a common covering.

The under row $R^2$, Fig. 2, of readers is the counterpart of the upper row $R^1$, except that the main weight is thrown on the side of the support opposite that where it is in the upper row, in order to make the points fall upward against the sheet $X^1$ $X^2$, instead of downward, as in the upper row. The points of the under line are set half an inch or so to the rear of those of the upper line, the music upon the lower side of the sheet being also printed to commence a corresponding distance behind that on the upper surface.

The guide G, Fig. 2, is a long, thin slot, of the exact width of the sheet, made by placing two pieces of smoothly-polished wood or metal, one upon the other, the upper one being held about the sixteenth of an inch from the lower one by two strips of metal, one at each side, which form the lateral boundaries of the slot. The paper entering and traversing this slot emerges from it to pass under the readers.

The performing apparatus consists of the electro-pneumatic or general action, and the special parts which it operates or by which it is modified. The actions of all the different kinds of instruments will be seen to be essentially the same in the principle of their construction — namely, an electro-magnet employed to work a train of wind-pockets; and they differ from each other only in the final forms which they assume in order to adapt them to the special work which each may have to perform. We shall therefore describe, first, the general action common to all the instruments; secondly, the special parts peculiar to each.

The general action consists of a magnet operating a train of wind-pockets, of which there may be from one up to four or five in the train, the number being relative, and depending on the size given to the initial valve—that is, on the amount of battery-power allowed for starting the train; on the size of the final pallet—that is, the number of instruments required to be played from it; and on the wind-pressure employed. There is a limit, however, to the number of removes, beyond which it is impracticable for musical purposes to push the reduplication of a train, for after the fourth or fifth pocket the ear detects the time lost in getting the train in motion. The last valve, called the main pallet throughout this description, and the pockets which it feeds, are in reality part of the general action, belonging strictly to the train, but being closely connected with the instruments to whose immediate working mechanism they belong. They are better considered with the special parts with which they are intimately connected.

The pockets of the general action are placed either inside or outside the various chests, boxes, or trunks containing wind, in order to secure the greatest compactness and facility in placing them. On the bottom of a chest, $B^1$, $B^2$, and $B^1$, Figs. 3 and 4, for instance, whose pallets are close together, they are alternated regularly, the internal ones, Fig. 4, porjecting over the same space which outside is covered by the external, Fig. 3. In this way all the actions necessary for a row of closely-arrayed pallets may be placed immediately underneath upon the bottom board $B^1$, Figs. 3 and 4, of the chest, half being inside and half outside. In some places a mixed action—that is, part of outside and part of inside pockets—fits in to better advantage, as may be seen in the drum action $a^1$ $a^2$ $a^3$ $a^4$ $a^5$, Fig. 7. As the valves for internal pockets differ from those for external ones, it is best to describe the general action as of two varieties, the internal and the external.

In the internal variety, Fig. 4, the magnet $a^1$, which is kept outside, so as to be easily accessible for regulation, operates a primary valve, $v$, consisting of a nut kidded on both surfaces, mounted on a wire at the end of the long arm of the lever $a^2$. This nut moves in a chamber in whose roof is a circular opening, slightly smaller than the nut, and in the floor of the chamber is a similar opening, also slightly smaller than the nut. The opening in the roof constitutes an ingress-aperture, through which the wind enters the chamber from the chest when the nut is at rest, and the opening in the floor constitutes an egress-aperture, through which the wind in the chamber and pocket $a^3$ escapes into the open air, when the magnet raises the nut against the ingress-aperture, and cuts off communication with the interior of the chest.

A groove, $m^1$, connects the chamber with the interior of the primary pocket. Another chamber, like this primary one, but on a larger scale, is formed for the valve $v^3$ of the secondary pocket $a^5$, which valve is raised by the tail-piece $a^4$, extending from the primary pocket $a^3$, and is depressed by the pressure of the wind on the valve $v^3$ itself, and by a weight, $z$, attached, when necessary, to overbalance the weight of the pocket-leaf. A groove, $m^2$, likewise, connects the secondary chamber with the interior of the secondary pocket $a^5$, whose leaf is attached to the main pallet $v^5$, Fig. 3, and is held up by the force of its spring Q. As long as the magnet does not act the wind has free ingress through the primary ingress-aperture to the interior of the primary pocket, whose leaf remains pneumatically in equilibrium by the equal pressure on both sides, while the weight $z$, together with the wind-pressure on the valve $v^3$ of the secondary pocket, keeps the leaf raised. The wind also has free access to the interior of the secondary pocket $a^5$, whose leaf is held up by the main pallet-spring Q, and by the wind-pressure on the pallet $v^5$ itself. When, however, the magnet acts, the primary valve $v$ is raised against the primary ingress-aperture above, closing it against the wind in the chest, and the wind already in the primary pocket $a^3$ escapes through the opened egress-aperture. Immediately the pressure in the chest collapses the pocket $a^3$, whose tail-piece $a^4$ being raised, reverses the secondary valve in the same manner, and the secondary pocket is collapsed, drawing down the main pallet.

The external action, Fig. 3, whose pockets $a^3$ and $a^5$ are outside, is the reverse of the foregoing. In it, when at rest, the ingress-apertures are closed by the upper valves $v^1$ and $v^3$, and the egress-apertures remain open. When in action the egress-apertures are closed by the lower valves $v^2$ and $v^4$, and the ingress-apertures remain open.

The final exit-valve $v^6$, Fig. 3, attached to the main pallet $v^5$, being of considerable size, is constructed with a spiral spring, $Q^2$, and pin $Q^3$ arrangement. The nut $Q^5$, at the end of the wire $Q^4$, holds in position the spiral spring $Q^2$, which is the antagonist of the pin $Q^3$. (A lump of solder does as well as a pin.) This pin is so placed on the wire that when the exit-valve $v^6$ is open the pin is a little above the face of the egress-aperture, and, the spring being resisted by the pin, the weight $z^2$ is free to hold the valve $v^6$ open. When the main pallet $v^5$ begins to open, and before it has gone far, the exit-valve, descending with it, is arrested by the rim of the egress-aperture, and the wire $Q^4$, being free to pass downward through the exit-valve, is drawn onward by the still descending main pallet, causing the pin to leave the under surface of the exit-valve, and compressing the spiral spring $Q^2$ more and more. When the main pallet, returning, is almost up, the pin again meets the under surface of the exit-valve, and, neutralizing the spring $Q^2$, leaves the weight $z^2$ and the pressure of the wind in the groove $M^3$ free to open the exit-valve.

The stop-slides of the instrument are similar in construction to those ordinarily employed on organ wind-chests. They are operated by electro-pneumatic actions, each action consisting of an electro-magnet and train of pockets, of which the last pocket $a^6$, Fig. 5, is attached to and moves the slide D. Each slide has two actions, one for pulling it on and one for pushing it off; and the only peculiarity about these actions, by which they differ from the note-actions hereinbefore described, is in the circuit-arrester, designed to cut off, at the proper moment, the electrical current, passed by the corresponding stop-handle of the key-board. The circuit-arrester consists of a metallic plate, $E^4$, Fig. 5, placed upon the slide, and two springs, $E^3$ and $E^5$, upon the immovable top board $B^3$ of the chest W. These springs, in one position of the slide, bear upon the plate $E^4$, but in the other position upon the non-conducting wood of the slide. The spring $E^3$ connects, by the line-wire $E^2$, with a corresponding key-board stop-handle, and the other spring $E^5$ connects, by the wire $E^6$, with the magnet of the electro-magnetic action which moves the slide, and of which $a^6$ is the terminal pocket. When the slide is turned "off," the metal plate $E^4$ of the circuit-arrester of the "on" action is under the points of the two springs, thus affording an open road to the "on" magnet to any current which may offer to pass. As soon as the corresponding stop-handle is drawn out a current is sent through by a connection made by the pulling out of the said handle, and the electricity thus reaching the "on" magnet starts its pneumatic train into movement, and the result is that the slide is pushed "on;" but just as the moving slide reaches the end of its stroke the plate $E^4$ upon it is carried beyond the reach of the immovable springs $E^3$ and $E^5$, which hitherto bore upon it, and the circuit established by the pulling out of the stop-handle is thus broken at another point, namely at the stop-slide itself, at the moment when the stop-slide has reached the full distance of its movement. In this way the electricity, which would continue to pass at the drawn stop-handle during the whole time that the stop is to be kept on, is cut off at the slide itself as soon as the slide has got into the position required; nor can it pass again until by reversing the stop-handle the "off" action, which in its arrangement is exactly similar to the above, shall have reversed the slide, whereupon the two springs $E^3$ and $E^5$ will again bear upon the plate $E^4$, and the road again be open to the magnet of the "on" action.

Figure 6:
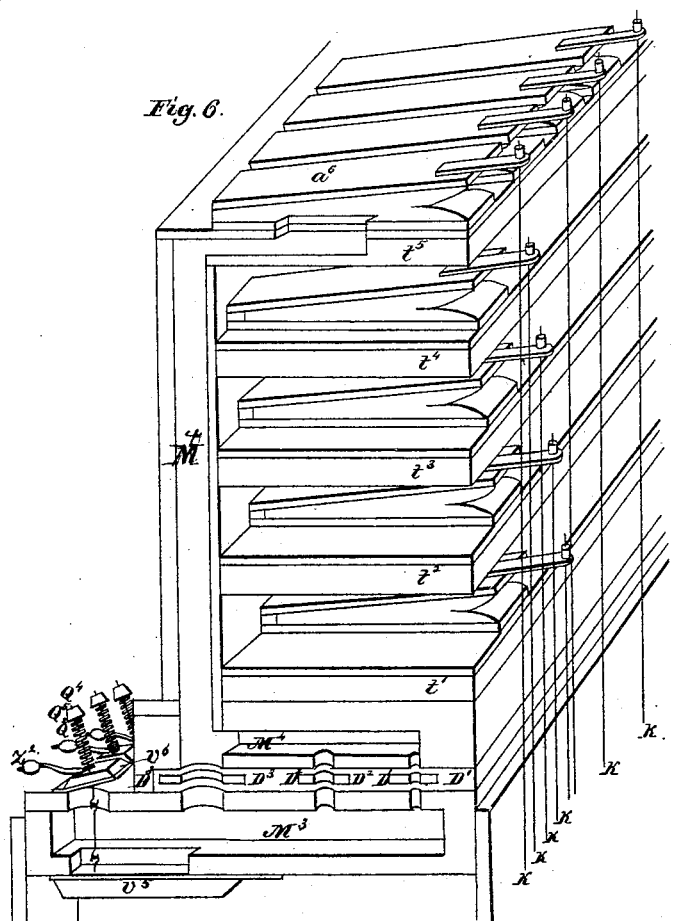

The piano-action, Fig. 6, consists of pockets $a^6$, controlled each by a pallet, $v^5$, and exit-valve $v^6$, and forming part of an electro-pneumatic train, and of slides $D^1$ $D^2$ $D^3$, containing holes of different sizes to govern the rapidity of the entrance of wind into the pockets. There is a pocket for every key, and a few others for the pedals.

The pockets are arranged in tiers $t^1$ $t^2$ $t^3$ $t^4$ $t^5$, as their width exceeds that of the keys, each tier being set such a distance to one side of its predecessor as is equivalent to the width of a key. The number of tiers is proportionate to the width of the pockets, which depends on their length, their stroke, and the wind-pressure. The wind is carried to them from the main pallet $v^5$ by grooves $M^3$ and $M^4$, along whose course are set the slides $D^1$ $D^2$ $D^3$.

These slides are constructed like the draw-slides of an organ wind-chest—that is to say, they have perforations in them, by which, in the "on" position of the slide, the wind can pass from the grooves $M^3$, Fig. 6, in the chest to the grooves $M^4$ leading to the pockets, while in the "off" position of the slide all intercommunication between said grooves is cut off by the interposition of the solid or non-perforated portions of the slide. Each slide is worked by two circuit-arresting electro-pneumatic actions, like the one hereinbefore described, and there should be at least three of these slides, each differing from the others in the size or diameter of its perforations. The object to be attained is the passage of different quantities of wind in a given time from the main grooves $M^3$ to the grooves $M^4$ leading to the striking-pockets $a^6$. The force of a blow imparted to a hammer depends not only on the actual amount of wind let into the striking-pocket, (for the pocket might be entirely filled, and yet so gradually as not to throw the hammer at all,) but more and mainly on the quickness or impetus with which the wind enters. Hence, by varying the size of the holes in each slide, and by turning on one or more at a time, differing quantities of wind can be thrown into the pockets in a given time, and six grades of expression may be obtained from three slides, as follows: The slide $D^1$ has the smallest holes, and passes sufficient wind to produce only a very gentle strike, *pp*. $D^2$, having larger holes, makes a more marked note, *p*, and $D^3$, with the largest holes, gives a still stronger sound, *mf*. These grades are obtained with one slide only, the others being turned off. Now, adding $D^1$ to $D^3$ the impetus is greater still, *f*, or adding $D^2$ to $D^3$ the strike is louder yet, *ff*. Finally, with all three open, $D^1$ $D^2$ $D^3$, the maximum or loudest effect, *fff*, is produced.

The upright piano is the preferable form to employ, on account of its shape and compactness, which enable it to be conveniently placed in connection with the other instruments, and also because no alteration of the instrument itself as generally made is needed to adapt it for the attachment of the electro-pneumatic action. The pockets $a^6$, Fig. 6, are connected directly by wires or cords K to that part of the piano mechanism called the "action," as distinguished from the key-levers, which it is not necessary to move when playing by the automatic reader. The keys, however, are not taken out of the instrument, for they neither interfere with the electro-pneumatic action, nor are interfered with by it, and they serve to make the piano still available for hand performance in the usual way.

The lower notes, as far up as the contra B, inclusive, are played from the corresponding grooves of the octave above by extra slides, which, when drawn, admit the wind into the pockets of these lower notes. The lower octave of chest-grooves, therefore, may be said to repeat on the piano, playing two octaves according to which slides are drawn.

The pedals are worked by trains of three pockets, which differ from those of the notes in being independent of the slides, and also in being larger and stronger. They have their own separate readers.

The drum-corps consists of a bass and a tenor drum, triangle, and cymbals. Their actions consist of electro-pneumatic trains, the last pockets of which operate directly upon the instruments.

Figure 7:
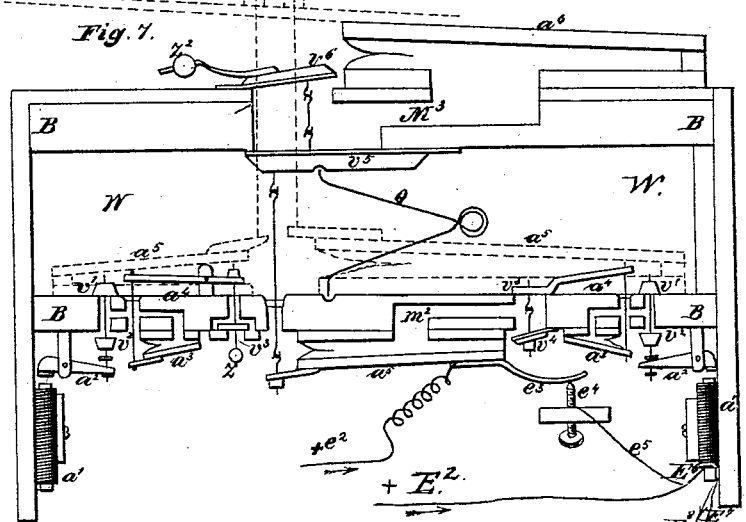

The tenor-drum action consists, Fig. 7, of a train of three pockets, $a^3$ $a^5$ $a^6$, the peculiarity of which is the circuit-breaker for making the train roll. From the rear of the secondary pocket $a^5$ projects a piece of spring-metal, $e^3$, which, when the pocket is shut, bears upon the point of a screw, $e^4$, adjustable in a frame, but which, when the pocket opens, is raised off from the screw $e^4$. The magnet has two readers, one for single taps, the other for rolling. The line-wire $E^2$ from the tap-reader passes directly to the magnet; that from $e^2$— the roll-reader—goes to the spring $e^3$, and from the screw $e^4$ the circuit is continued ($e^5$ $E^6$) onto the magnet. While the action is at rest the connection is complete between the spring $e^3$ and the screw $e^4$; but when rolling, the magnet $a^1$, by putting the train into action, cuts off its own connection with the roll-reader, and the pockets, thereupon collapsing, restore the interrupted connection, again starting the magnet and train, to be followed by another collapse. As long as a current arrives from the roll-reader this intermittent action continues, producing a roll in the tertiary pocket $a^6$, the rapidity of which can be governed by setting the adjustable screw $e^4$.

The pockets $a^5$ and $a^5$, represented in the figure by dotted lines to indicate that they are in a plane farther back than that in which the sectional view is taken, are secondary pockets belonging to separate actions, the magnet $a^1$, primary pocket $a^3$, and primary ($v^1$ $v^2$) and secondary ($v^3$) valves of one ($a^5$) of which are seen in the figure. That of the other $a^5$, being like the one shown, is not represented. They are mixed trains, being made partly external and partly internal, merely for convenience in placing, and they are employed to resist or pull against the tertiary pocket $a^6$ when desired, so as to modulate the force of the drumming. They each have their own reader, and being of unequal size and strength, each produce a different grade of expression, and, when acting together, still further alter the vigor of the drumming. By two such pockets, therefore, four degrees of loudness can be produced—by the tertiary pocket unresisted, resisted by each, resisted by both.

When the tenor-drum is set in a case with other instruments its snares are rattled by the concussions and vibrations of the music, even when the drum itself is not playing. To avoid this, and also to vary the character or sound of the drum, its snares are muffled by looping over them a strand of silk, made fast at its other end to a lever, from which depends a ball whose weight keeps the snares off the drum-face. An extra train is attached to the lever, on raising which the weight is taken off the silk strand, thereby returning the snares to the drum-face. Thus arranged, the rattle is not only prevented, but the instrument can be played, at pleasure, either as a muffled or as a snare drum.

The electro-pneumatic tremolo $a^5$ $e^9$, Fig. 8, is a train of two pockets, (one pocket may be made to suffice,) on the second of which is a spring, $e^9$, and screw $e^{10}$ arrangement, exactly like that on the tenor-drum action, and rolling in the same manner. It is located on the return wire $e^8$ belonging to the magnets of all those trains which play musical notes proper, as distinguished from those which work stops, drums, &c. Hence, when it acts it causes all such trains playing at the time to roll, producing a very marked tremolo or shake of the music. The magnets of the drums, and those of the stops and other mechanical movements, communicate with the battery by another return wire, $E^8$, so as to avoid the tremolo, which is intended only for the musical-note-producing instruments.

The battery for supplying the electricity to the instrument is so arranged, Fig. 8, that, on pumping, the zinc E, Fig. 8, (and, in some forms of battery, both plates,) is immersed in the liquid automatically by the wind, and is held out of it either by spring or weight when the instrument is not in use. For this purpose the zinc E is suspended so that the spring $T^2$ (or a weight) keeps it out of the liquid except when depressed by the inflation of a pocket, T, which, being connected, $T^3$, with the central reservoir, acts as soon as the pumping begins, and retains the plate in the liquid as long as there is any wind in the instrument. When the wind is out, the spring $T^2$ shuts the pocket and raises the plate.

A pocket made with several ribs, in the shape of an accordeon-bellows, and with the spring inside, has the advantages of greater compactness and a neater appearance over the ordinary form; but it is not more efficient, and is not as easily made.

We claim as our invention—

1. The combination of opposite rows of readers, arranged to read simultaneously from opposite surfaces of the music-sheet, substantially as described.

2. The combination, with a set of conducting-fingers, of a non-conducting comb to determine the position of the fingers, substantially as described, and for the purpose set forth.

3. The combination of an electro-magnet and armature with an internal pocket or train of pockets, substantially as described.

4. The internal or "chamber valve" used in this combination, which, when starting into action, moves against the wind-pressure to close the ingress-aperture, and, when returning to rest, moves with the wind-pressure to close the egress-aperture, substantially as described.

5. The combination of an electro-pneumatic action with a circuit-arrester upon a draw-slide, substantially as and for the purpose set forth.

6. The graduating piano-action consisting of the combination of a series of slides with the electro-pneumatic trains, for the purpose of varying the force of the impulses delivered to the piano-hammers by the final pockets of these trains, substantially as described.

7. The combination of an intermitting circuit-breaker with an electro-pneumatic train, to produce a rolling electro-pneumatic action for drums and other percussion-instruments, and for tremolo, substantially as described.

8. In an electro-pneumatic drum-action, the combination of one or more resistance-pockets with the main or striking pocket, to modify the force of the blows, substantially as set forth.

9. The battery-plunging pocket, to automatically lower and raise the battery-plates into and from the exciting-liquid, substantially as described.

WILLIAM FORD SCHMOELE.
HENRY SCHMOELE, JR.

Witnesses:
H. SCHMOELE, M. D.,
CHARLES SCHMOELE,
EDWIN HALL.